E. CRANE.
Assignor to C. La Dow.
Harrow-Cultivator.
No. 8,260. Reissued May 28, 1878.
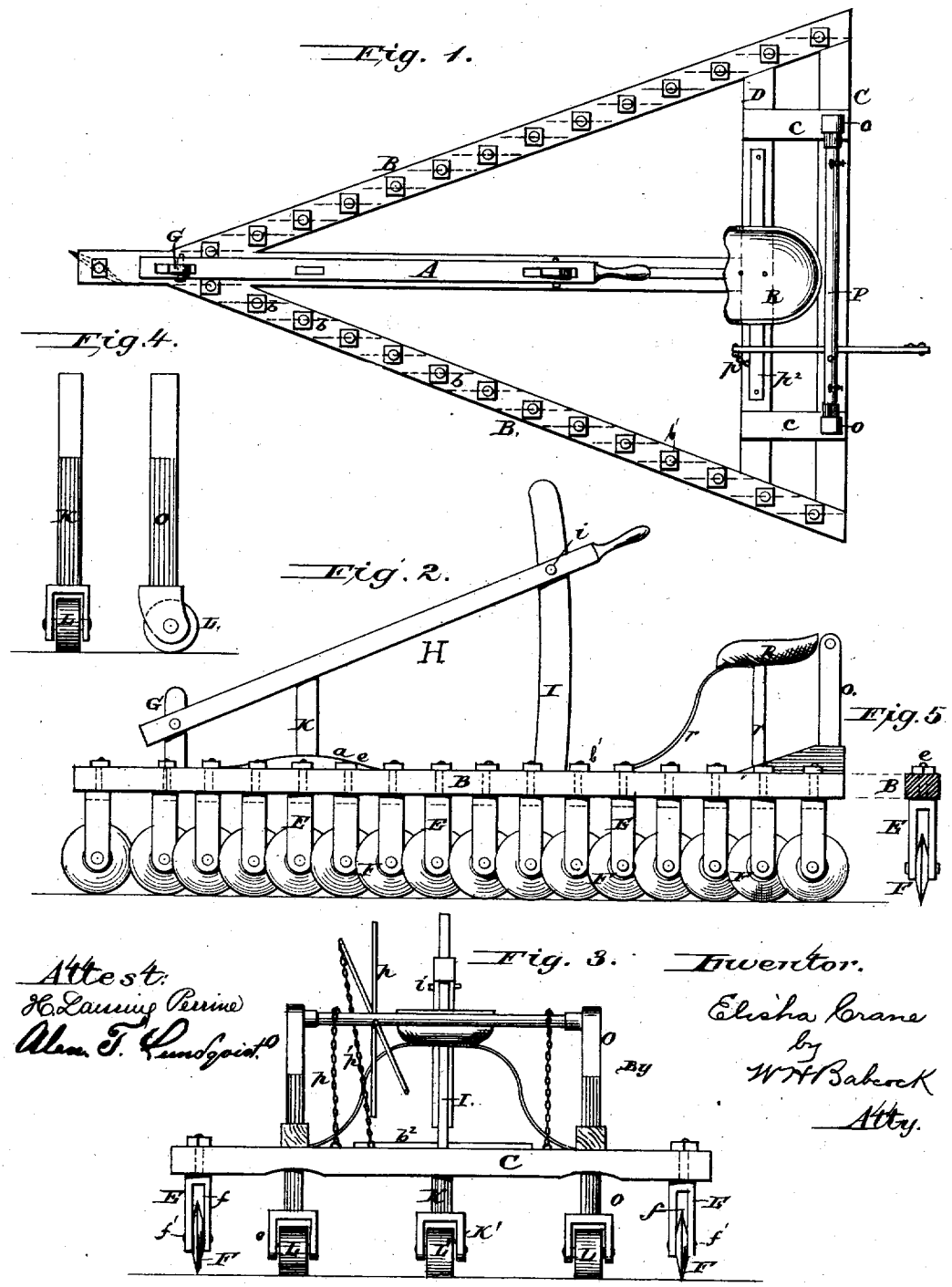
Attest.
H. Lanning Perine
Alex. F. Lundgren
Inventor.
Elisha Crane
by
W. H. Babcock
Atty.
N. PETERS, Photo-Lithographer, Washington, D. C.

UNITED STATES PATENT OFFICE.

ELISHA CRANE, OF ELKHART CITY, ILL., ASSIGNOR TO CHARLES LA DOW.

IMPROVEMENT IN HARROW-CULTIVATORS.

Specification forming part of Letters Patent No. 73,876, dated January 28, 1868; Reissue No. 8,260, dated May 28, 1878; application filed May 16, 1878.

*To all whom it may concern:*

Be it known that I, ELISHA CRANE, of Elkhart City, in the county of Logan and State of Illinois, have invented certain new and useful Improvements in Cultivators; and I do hereby declare that the following is a full, clear, and exact description thereof, which will enable others skilled in the art to which it appertains to make and use the same, reference being had to the accompanying drawings, and to letters of reference marked thereon, which form a part of this specification.

In said drawings, Figure 1 represents a plan view of my improved cultivator. Fig. 2 represents a side elevation of the same. Fig. 3 represents a rear elevation of the same. Fig. 4 represents, in detail, a side and end view of the uprights and wheels for transporting the machine. Fig. 5 represents, in detail, an edge view of one of the disk-standards, having the disk mounted in an open slot therein.

This invention relates to that class of cultivators which are provided with vertically-rotating cutters for tearing, furrowing, and pulverizing the soil. Hitherto such cultivators have been constructed with a square frame, or other frame having a broad front, which will not allow the cultivator to readily turn aside on meeting with a stone, stump, or other obstacle. The gangs of disks or cutting-wheels have also been arranged so as to be liable to vibration, relatively to said frame, either vertically or horizontally, which impairs the steadiness and evenness of the work. The cutting wheels or disks also have been made incapable of adjustment with respect to the line of draft.

The object of my present invention is to remedy the foregoing and other disadvantages, and to produce a cultivator with vertically-rotating disks superior to any other hitherto in use. This object is accomplished, first, by the combination, with a triangular frame, of a leading disk at the apex of the triangle, and a series of following disks on each side thereof; secondly, by the combination, with a frame of opposing gangs, of revolving disks overlapping each other, in order that each disk may clean the one immediately preceding it; thirdly, by the combination, with a frame of gangs, of revolving disks set at opposite angles to each other, said gangs being confined by said frame to the same horizontal plane; fourthly, by the combination of a frame and driver's seat with gangs of revolving disks, each gang being arranged at an opposite angle to the other on said frame, and the driver's weight enforcing a uniform cutting action on the wheels or disks of said gangs; fifthly, by the combination, in a cultivator, of a frame with gangs of vertically-rotating disks, each wheel having its cutting-edge adjustable relatively to the line of draft; sixthly, in the combination, with a cultivator-frame, of gangs of revolving disks attached thereto, said gangs extending rearwardly and outwardly from the line of draft; seventhly, in providing a cultivator with a revolving disk, having an axle attached at two points by a support, said support being adjustably connected to a frame by means of a pivoted clamping device, which can be adjusted to securely retain said axle in the desired position relatively to the line of draft; finally, in divers other improvements, hereinafter more particularly set forth.

The frame of my machine closely resembles, in form and general construction, the triangular harrow-frame now in common use.

In the accompanying drawings, A designates the center-beam, to which, near its front, are attached the forward ends of the wing-beams or gang-bars B B, the rear ends of said wing-beams or gang-bars being secured to and braced and separated by a cross-bar, C. Immediately in front of cross-bar C is another cross-bar, D, which is firmly mortised into the said wing-beams or gang-bars, and near its middle furnishes a bearing for beam A, which is firmly secured thereto. In the forward end of the beam A, just behind where the clevis is attached, is a vertical aperture, and also along the entire length of the wing-beams or gang-bars B B there are apertures or openings arranged at intervals. Said apertures in the center beam and the apertures in said gang-bars are adapted to receive the upper screw-threaded shanks *b* of the bifurcated disk-carrying standards E. In an ordinary machine—say twelve feet by eight—these holes in said gang-bars are arranged about eight inches apart. The portions of the disk-standard shanks *b* which extend above said gang-bars or wing-beams and said center-beam are provided with nuts *b'*, which secure said standards to the beams B A.

When the desired cut of the disks is ascertained, the said disks are turned to the proper angle by turning their standards E on the axis of shanks *b*. Nuts *e e* are then tightened, so as to clamp said disks in the position desired. Said standards E are all slotted vertically at *f*, so as to give a bifurcated form to their lower ends. In these slots *f* I mount the axles *f'* of vertically-rotating circular cutting disks or blades F. These cutters or disks are so arranged that each will project beyond the rear edge of the one immediately in front, so as to remove from it the clods of earth and other matters picked up in rotation. The forward disk of each gang overlaps or crosses a line rearward from the leading disk of the machine, thereby preventing uncut spaces between the gangs.

The construction above described gives a triangular cultivator, which has all the advantages of other rotary-cutter cultivators, and is less likely to strike an obstruction than those which have broad fronts, it being readily deflected from anything encountered. Unevenness of soil will also cause much less inconvenience, since there is only the point to dip or rise instead of a broad front. The horses can also turn with much greater convenience than if the gangs of disks extended laterally at right angles from the line of draft.

I support, by suitable seat-bars *r*, a driver's seat, R, on cross-bar D and the rear end of beam A, so that the driver's weight, when occupying the same, will force the said disks into the soil and hold them to their work.

It will be observed that the construction above described confines the gangs of disks to the same horizontal plane with each other and with the frame. This makes the depth of cut uniform, insuring even work throughout the field, and allows a much stronger construction than when vertical vibration is possible.

The transverse bars C D steady and brace the gang-bars or wing-beams B, compel the gangs to work at a suitable angle, and prevent them from being swung round by obstructions.

When the machine is in operation there is great strain on the axles *f'* of disks F. It therefore becomes necessary, or very desirable, to sustain and brace said axles at each end. For this purpose the bifurcated standards E are well adapted.

At the front of beam A, and near its point of contact with the wing-beams or gang-bars B, I secure a standard, G. To this standard G there is pivoted a lever, H, which is slotted on its lower end and works on a perforated curved arm, I. To this lever H I firmly bolt the upright link or standard K. This link or standard K passes through the beam A in the center of its upward curve *a*, and may have its lower portion incased in metal. To the lower end of this standard K I firmly attach a forked swivel-plate, K', in the fork of which is secured wheel L'.

To the beams C D I attach slotted boss-bearing timbers *c c*. Beam C is slotted also. Through the slots in parts C *c* work the uprights O, which support windlass-shaft P, operated by handles *p*. On the lower end of these uprights I attach forked swivel-plates *o*, which form bearings for wheels L. Chains *d d* are firmly secured at one end to shaft P, so as to be capable of winding thereon, and at the other end to beam C. To one handle, *p*, is attached a check-chain, $p^1$, having its other end fastened to check nail or catch $p^2$.

By pressing the power end of lever H downward the disks F at the front end of the cultivator may be raised from the ground. A pin, *i*, is then inserted, so as to lock said lever down and hold said disks up. Windlass-shaft P is then turned, so as to raise the rear disks in like manner, and made fast by said check-chain $p^1$ and said check nail or catch $p^2$. The machine is then drawn to the field on wheels L without the disks F touching the ground. On reaching the field the pin *i* is removed and check-chain $p^2$ is freed, so as to allow the said disks F to fall to the ground, where, when drawn forward, they operate on the soil, as described.

The above-described raising and lowering and fastening devices are also capable of use for regulating the depth of cut.

Having thus fully described my invention, what I claim as new, and desire to secure by Letters Patent, is—

1. In a cultivator, the combination of a triangular frame with a leading cutting-disk at its apex and a series of following-disks on each side thereof.

2. In a cultivator, the combination, with a frame, of opposing gangs of revolving disks, overlapping each other.

3. In a cultivator, the combination, with a frame, of gangs of revolving disks, said gangs being set at opposite angles to each other, and confined by said frame to the same horizontal plane.

4. In a cultivator, the combination of a frame and driver's seat with gangs of revolving disks, each gang being arranged at an opposite angle to the other on said frame, and the driver's weight enforcing a uniform cutting action on the disks of said gangs.

5. In a cultivator, the combination of a frame with gangs of vertically-rotating disks, each wheel having its cutting-edge adjustable relatively to the line of draft.

6. In combination with a cultivator-frame, two gangs of disks attached thereto, said gangs extending rearwardly and outwardly from the line of draft.

7. In combination with a cultivator-frame, a revolving cutting-disk having its axle supported at two points, its support being provided with a clamping device for holding said axle in the desired position relatively to the line of draft.

8. In a cultivator, the combination of two disk-gang bars, a central draft-bar, and a transverse brace-bar with a seat for the driver supported from three points by connections attached to the frame.

In testimony that I claim the foregoing I have hereunto set my hand in the presence of the subscribing witnesses.

ELISHA CRANE.

Witnesses:
WM. H. DAVIS,
CHARLES THOMPSON.